July 17, 1951

C. S. CHARRON ET AL 2,561,050

METHOD AND APPARATUS FOR CUTTING FLAT
SHAPED PIECES FROM PLASTIC MATERIALS

Filed Feb. 23, 1946

INVENTORS
C. S. CHARRON
L. CRAWFORD-BROWN
By Fetherstonhaugh & Co
ATT'YS

July 17, 1951

C. S. CHARRON ET AL 2,561,050

METHOD AND APPARATUS FOR CUTTING FLAT
SHAPED PIECES FROM PLASTIC MATERIALS

Filed Feb. 23, 1946

INVENTORS
C. S. CHARRON
L. CRAWFORD-BROWN

By Fetherstonhaugh & Co.
ATTYS

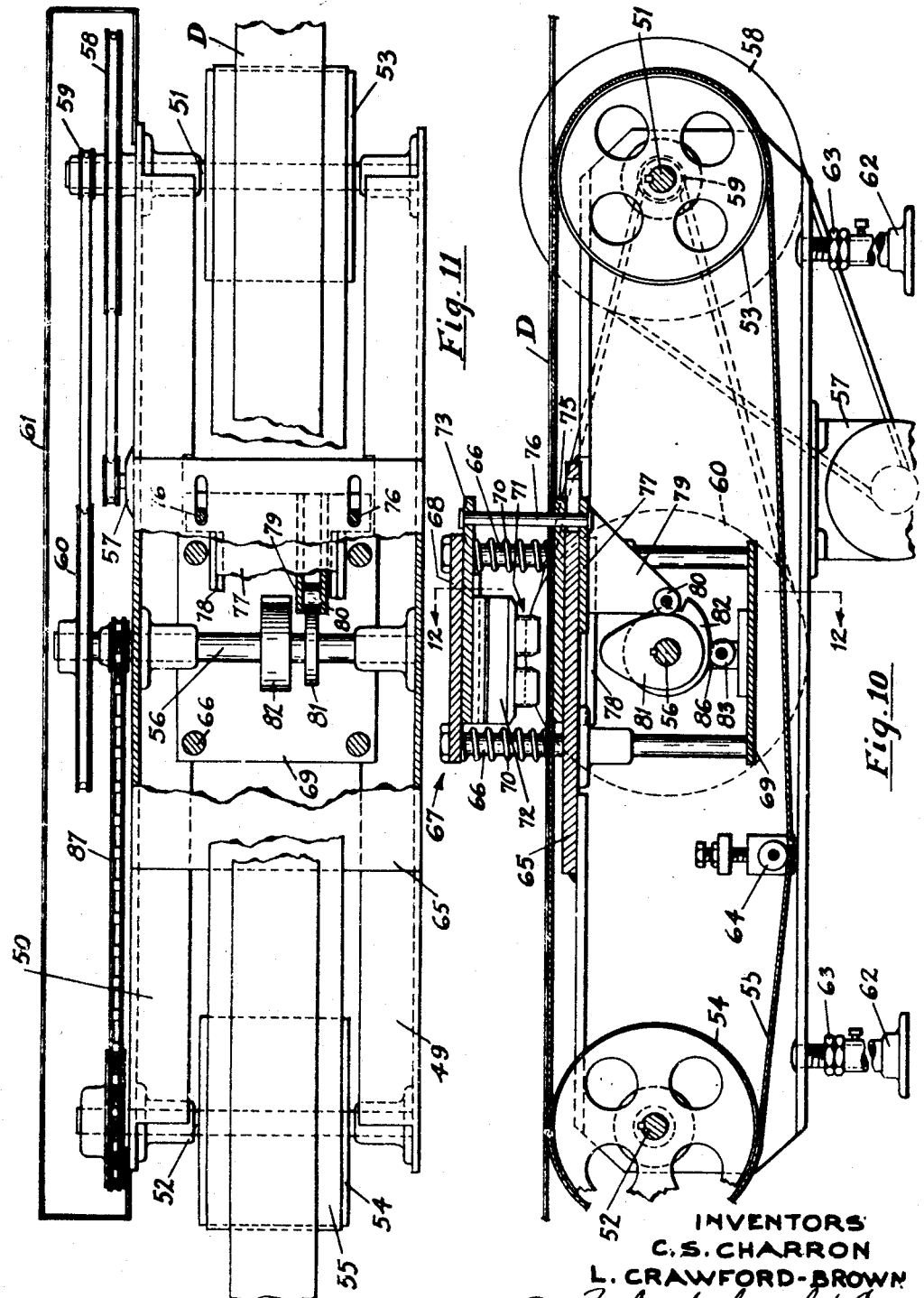

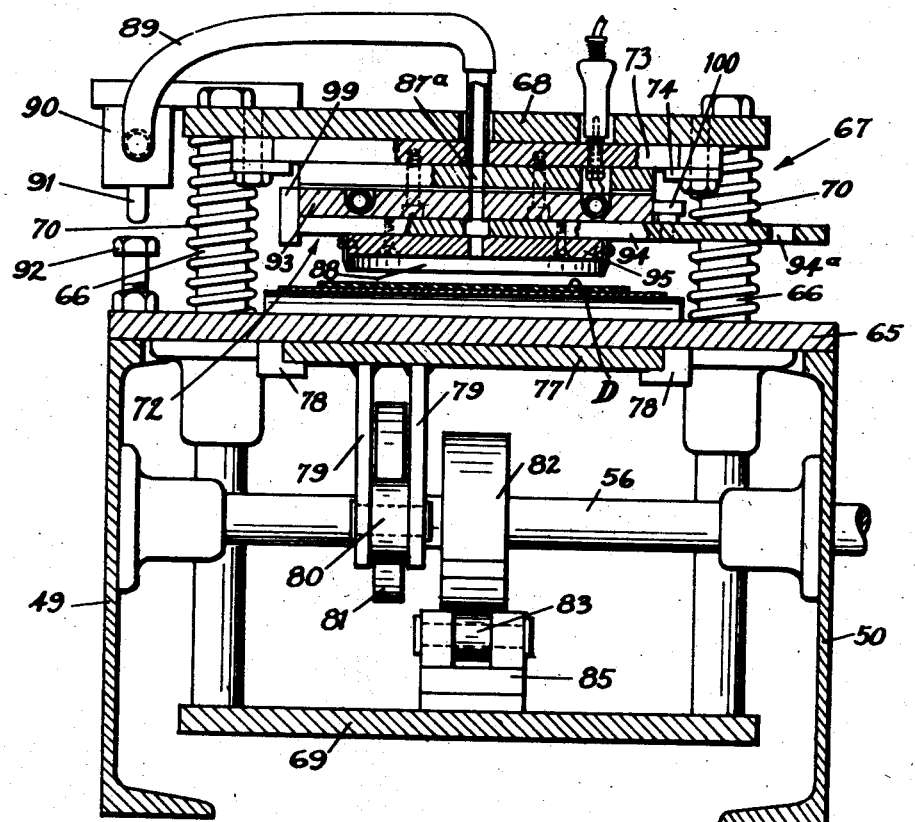

Patented July 17, 1951

2,561,050

UNITED STATES PATENT OFFICE 2,561,050

METHOD AND APPARATUS FOR CUTTING FLAT SHAPED PIECES FROM PLASTIC MATERIALS

Charles S. Charron and Lyman Crawford-Brown, Toronto, Ontario, Canada

Application February 23, 1946, Serial No. 649,542

7 Claims. (Cl. 164—18)

This invention relates to a method and apparatus for cutting flat shaped pieces from plastic material.

In the present specification, we use the term plastic material in the broad sense to apply to such materials as raw, semi-cured material or synthetic rubber, thermo plastics, etc. It will be understood, therefore, that the invention applies to all plastic materials capable of being cut by a hot cutter.

The invention can clearly be illustrated by reference to the cutting of shoe parts wherein it has been the general practice in the past to die-cut these materials, usually by hand, employing a die which is percussively engaged each time the die is applied to the material for instance, in order to cut out a sole. In another method the soles are cut by a travelling knife or disc operating around a suitable pattern. Such methods are relatively slow in operation and require considerable amount of man power. These are among some of the disadvantages of the prior practice. Such disadvantages can be avoided under the present invention.

It is an object of the present invention to provide a simple method of cutting out flat shaped pieces, such as shoe soles and parts, and other patterned bodies from suitable plastic material wherein the article may be cut out quickly and preferably in quantity.

A further object of the invention is to provide a method of this kind which may be adapted readily to various of said materials and regardless as to whether the material may tend to have adhesive characteristics.

A still further object of the invention is to provide a simple apparatus for effectively and quickly dieing out articles of this kind either singly or in multiple.

A still further object of the invention is to provide a special die construction for cutting articles of this kind.

A still further object of this invention is to provide cutting devices which may be readily adapted to a complete and automatic apparatus for carrying out the operations rapidly and systematically.

With these and other objects in view, the invention generally comprises a cutting die having a cutter of the required outline and a means for heating the cutter so that the cutting operation is effected quickly and accurately. The heated cutting apparatus preferably is adapted to multiple cutting by way of a practical assembly of die elements in combination with cooperating means for handling the material from which the articles are cut.

The invention will be clearly understood by reference to the following details specification taken in conjunction with the accompanying drawings.

In the drawings—

Fig. 10 is a longitudinal section taken through a machine for automatically cutting articles from sheet material illustrating various of the operative parts thereof for performing the functions required.

Fig. 11 is a top plan view of the machine shown in Fig. 10 with part of the super-structure broken away more clearly to illustrate the underlying parts.

Fig. 12 is a transverse section taken through the machine illustrated in Figs. 10 and 11.

Fig. 13 is an enlarged transverse section taken through the platen carrying the die to show the manner in which the die is releasably carried.

Fig. 14 is an enlarged partly sectional fragmentary view of a controlling cam employed in the machine to illustrate the manner in which one particular operation is effected; and Fig. 15 is an enlarged sectional detail of another form of die knife to illustrate the manner in which it is formed.

Figure 1:
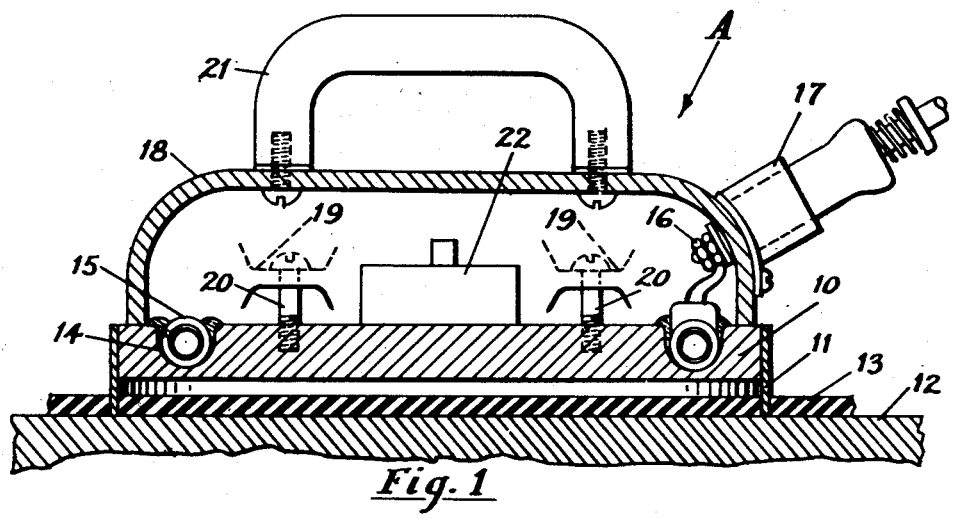
Fig. 1 is a transverse section taken through a die according to the present invention illustrating the heating coil and die cutting contour heated thereby.

Referring to the drawings, and first of all particularly to Fig. 1, A indicates a hand die according to the present invention which consists of a metal base 10 of predetermined contour designed to carry on its periphery the die knife 11. The die knife 11 conforms to the contour of the base 10 and is in effect a continuous endless member designed to form, at the lower cutting edge 12 thereof, the outline of the article which it is adapted to cut from suitable sheet plastic material 13. The die cutting knife 11 is fastened to the base in any suitable manner.

The base 10 according to the present invention is designed to be heated in such a manner that the heat is readily conducted to the die cutting knife 11. This may be accomplished by forming a channel or groove 14 in the upper surface of the base 10 and mounting therein a suitable electrical element 15, the terminals of which are conductively connected, in suitable manner, with the terminals 16 of a socket connection 17 projecting from the casing 18, which, encloses the upper surface of the base. The casing 18 may be fastened to the base 10 in any suitable manner such as by partially recessing the outer surface of the casing to form a ledge 19 which is bored to permit the screws 20 to pass therethrough into suitable orifices in the upper face of base 10. A suitable handle 21 may be mounted on the casing. In order to control the heat of the base 10 as required, a suitable thermostat 22 of suitable character is incorporated in the unit.

The base is heated to the required degree, thus to heat the die knife 11, and it is then only necessary to press it down upon the sheet material 13 so that the heated die immediately cuts through the material cleanly.

Figure 2:
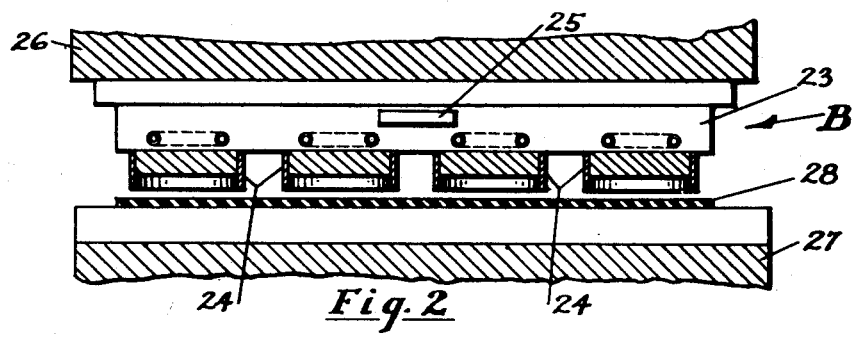
Fig. 2 is a schematic illustration of a multiple die formed as one platen of a cutting press.

A multiple die unit B may be provided as shown in Fig. 2, the base 23 of which is designed to carry a plurality of die elements 24. These die elements are of substantially similar construction to that described in Fig. 1 but eliminating the housing 18 and the thermostat 22. A common thermostat 25 may be provided in this case. The base B is fastened in any suitable manner to the movable platen 26 of a suitable press and the surface of the stationary platen 27 of the press is designed to carry the sheet material 28. In this manner, therefore, the articles may be cut in multiple by the raising and lowering of the movable platen 26 of the press and the shifting of the sheet material 28 from which the articles are cut.

Figure 3:
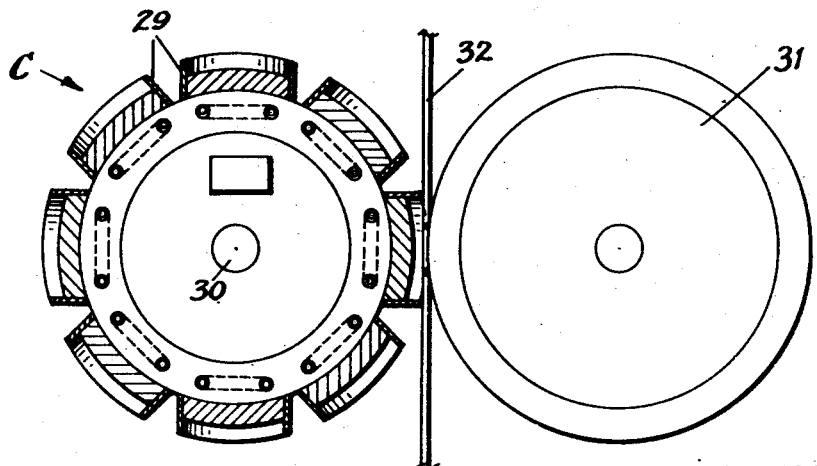
Fig. 3 is a schematic illustration of a multiple rotary die according to the present invention to illustrate another manner in which the articles may be cut.

The same effect may be produced by means of the rotary die C shown in Fig. 3 carrying the die cutting units 29 which are heated in a similar manner and thermostatically controlled, the rotary die being mounted on a suitable shaft 30 which is rotated by suitable means in conjunction with a cooperating pressure roller 31, the sheet material 32 passing therebetween as the cutting operation progresses.

Figure 4:
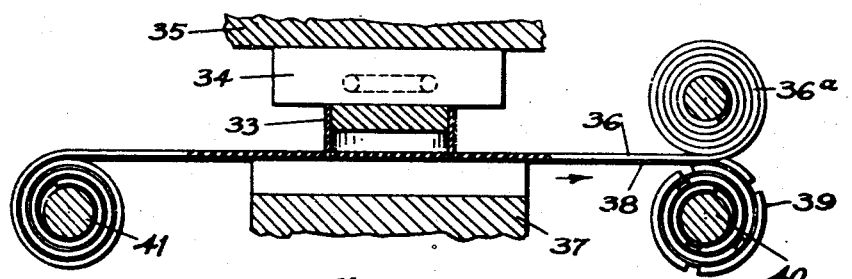
Fig. 4 is a schematic, partly sectional view of another manner in which the articles may be cut according to the present invention when employing a press cutter.

In Fig. 4 a method of cutting material which may have adhesive characteristics is illustrated. Here the die element or elements 33 are carried on a base 34 secured to a movable platen 35 of a press, while the material 36 is designed to be moved over the upper surface of the lower stationary platen 37 of the press. The material 36 is backed with a suitable web of material 38 to which the cut parts are preferably caused to adhere in the operation. In this connection as the die effects the cutting operation, the web of material 38 together with the cut parts adhering thereto is automatically rolled as at 39 on a suitable shaft or drum 40 so that it is automatically rerolled as it is fed off the shaft or drum 41. However, the waste reclaimable material 36ª is stripped from the web 38 and rolled in suitable manner on an independent roll so that it may be removed as a body and returned for reclaiming operations. As a result, therefore, the shaped, cut parts are neatly stored in a roll of material protected by the web 38 and it is but a simple matter to unroll it and remove the cut parts as they are required for use. Accordingly, therefore, an apparatus of this kind may be operated by intermittently rotating the shafts or drums 40 and 41 in cooperative relation to the vertical reciprocation of the die cutter 33 so that the material is thus cut quickly and efficiently and automatically stored as it is cut. Alternatively, however, the shaped pieces may be left temporarily as part of the sheet material and the whole rolled on the shaft or drum 40 (Fig. 4A) in which case the web of material 38 serves to prevent adhesive surfaces of the sheet from adhering on to the other. In this case the cut material would be partly attached to the waste reclaimable sheet by small webs as will be referred to hereinafter.

Figure 5:
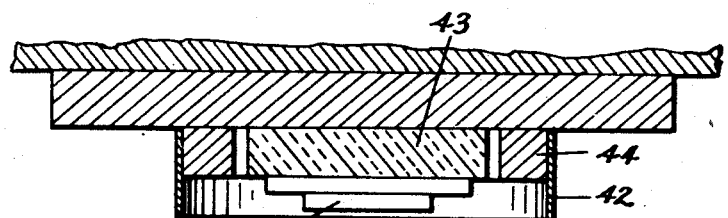
Fig. 5 is a transverse section taken through a die according to the present invention and showing the manner in which an embossing die may be incorporated therewith and which is heated to a lesser degree than the cutting contour of the die.

In Fig. 5 a similar die structure is shown to that previously described, including the peripheral cutting knife 42. This is heated in the manner described. In this case the centre portion 43 of the base of the die cutter is of material which does not have as great heat conductivity as the portions 44 so that an embossing die 45 may be mounted thereon and heated just sufficiently to provide for a simultaneous embossing of the article as it is cut by the die knife 42.

Figures 6, 7:
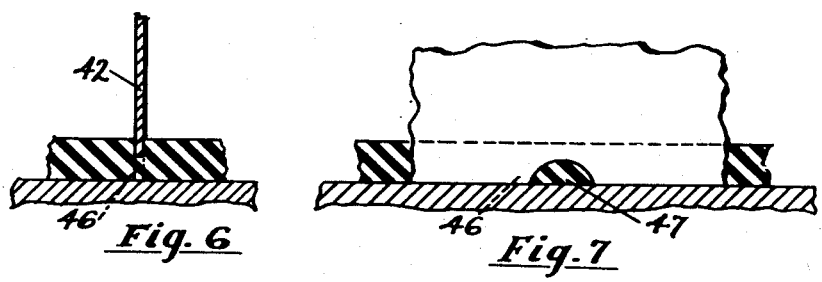
Fig. 6 is an enlarged fragmentary illustration with a portion of the die knife passed through a ply of the material and wherein the die knife is notched so as to leave a small web of material between the outline of the article cut and the base from which it is cut.
Fig. 7 is an enlarged fragmentary illustration similar to Fig. 6 taken at 90° thereto to illustrate the manner of the notch and the web formed thereby.
Figure 8:
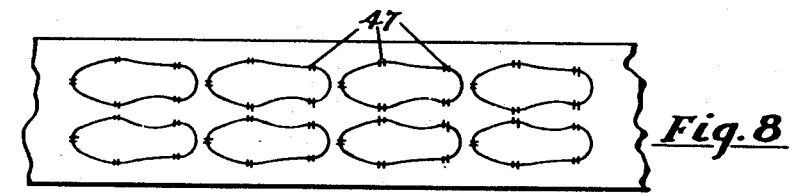
Fig. 8 is a fragmentary plan view of a sheet of material illustrating the outlines of soles cut by the die and the approximate location of the webs of material left between the cut-out sole and the body of material from which it is cut.
Figures 4A, 9:
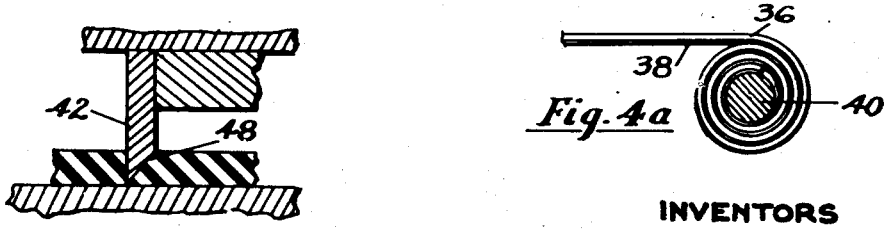
Fig. 4A is a fragmentary sectional view of an alternative manner of handling the cut material.
Fig. 9 is an enlarged fragmentary sectional detail of a portion of the die knife entered into the material to be cut wherein the die knife is bevelled downwardly and outwardly to form a bevelled edge on an article cut.

In the multiple cutting of shoe parts and other shaped articles, instead of cutting them completely from the sheet, as above described, it may in some cases be desirable to permit them to be carried away by the sheet as it travels from the die, as in the case of Fig. 4A above. In this connection, the die knife 42 is formed with suitable notches 46 (Figs. 6 and 7) so that when the die passes through the sheet material, small webs 47 of material are left between the sheet and the cut outlines of the article, such as illustrated in general plan detail in Fig. 8.

In the case of soles in particular, it is desirable in many instances to provide for a bevelled edge. In this connection, the die knife 42 may be formed with the downwardly and outwardly bevelled portion 48 which, when it cuts through the material, forms a suitable bevel as shown in Fig. 9.

In Figs. 10, 11 and 12, an automatic machine for carrying out the die cutting operations is illustrated which may be made up of a frame composed of the side channels 49 and 50 each carrying suitable bearings for rotatably carrying cross shafts, viz., the idler shaft 51 and the driven shaft 52 which carry pulleys 53 and 54 respectively, over which the endless belt 55 is designed to travel. Suitable bearing journals are also provided for the actuating shaft 56 disposed substantially centrally of the machine and designed to effect the die cutting operation. In this connection, from a suitable motor 57 a pulley 58 freely mounted on the idler shaft 51 is driven by a belt connection. The shaft 51 also freely carries the small pulley 59 forming a part of or rigidly connected with pulley 58 and belt connected with the large pulley 60 on the actuating shaft 56 so as to cause a relatively slow rotation of shaft 56. The several pulleys may be suitably enclosed by a guard 61.

The channel frame may be mounted on the feet 62 (Fig. 10) which are formed with the adjustable means 63 so that the level of the machine may be varied as required. Moreover, a suitable adjustable idler 64 is provided to engage the belt 55 to cause it fully to clear the lower portions of the apparatus during their operation.

Overlying the shaft 56 is a base plate 65 rigidly mounted on the spaced apart channels 49 and 50. This is suitably orificed to permit the standards 66 of a suitable movable carriage 67 to pass therethrough. The carriage includes the top plate 68 and the bottom plate 69 while suitable coil springs 70 encircle the upper portions of the standards 66 and extend between the top plate 68 and the plate 65 mounted on the frame so that the carriage is resiliently mounted and accordingly is depressible. The cutter die assembly 71 is mounted on a suitable base 72 in turn mounted on the sliding platen 73 which is slidably carried by the guide elements 74 (see Fig. 12) which are connected with the upper plate 68 of the carriage 67. A cooperating lower sliding platen 75 is mounted on the plate 65 and is designed to underlie the belt 55.

The upper sliding platen 73 and lower sliding platen 75 are connected for corresponding sliding connection by means of vertical pins or rods 76 which are rigidly carried by the actuating plate 77, slidably mounted on the lower surface of plate 65 in suitable guides 78. A pair of spaced apart bracket arms 79 are carried by the actuating plate 77 and carry therebetween, at their lower ends, a suitable cam roller 80. This is designed to be engaged by a cam 81 keyed on the shaft 56 so that rotation of the cam 81 is designed gradually to cause the actuating plate 77 to slide to the right, as viewed in Fig. 10, corresponding to the movement of the belt 55, and, the material from which the articles are designed to be cut.

Mounted beside cam 81 on shaft 56, as shown particularly in Figs. 11 and 12, is a cam 82 which is designed to cooperate with a roller 83 suitably mounted from the base plate 69, so that, as the cam rise of cam 82 gradually engages the roller 83 the carriage 67 will be downwardly moved against the compression of mounting springs 70. Therefore, the cutting knives 71 of the die or dies carried on the base 72 will be caused to be moved down to engage and traverse the sheet of material D. This must take place rather quickly while the release of the cutting knives from the material after cutting operation should be an instantaneous withdrawal.

The instantaneous withdrawal is provided for between the shoulder formation on the cam 82 and the particular structure of the roller 83 and its mounting. In this connection reference is made to Fig. 14 wherein the cam rise terminates in the abrupt shoulder 84. Moreover, the roller 83 is mounted in a bifurcated bracket 85 (see Figs. 12 and 14) and is of a width less than the width of the cam so that portions of the arms of the bifurcated bracket will overlap the outer edges of the cam. The top surface of these arms are disposed at a tangent to the upper extremity of the circumference of the roller 83 and provide a retaining shoulder 86 laterally beyond the upper surface of the roller and when the shoulder 84 passes this upper extremity it is not possible for the carriage to start to move upwardly which would normally be caused by the roller 83 engaging the cam rise and permitting gradual upward movement, as the cam rise travels downwardly on the arcuate surface of the roller. Instead the shoulders 86 form a continuing guide surface to maintain the carriage in the maximum depressed position corresponding to the position reached when the maximum cam rise is engaging the upper extremity of the roller 83. Therefore, when the cam rise passes beyond the outer extremity of the shoulders 86 the shoulders are then permitted sharply to rise upwardly to engage the lowermost point of the cam beyond the shoulder 84 thereof, and as a result an instantaneous withdrawal of the cutting knife 71 of the dies will be achieved. It will be appreciated, however, that as the cam rise of the cam 82 starts to cause the carriage 67 to move downwardly the gradual rise of cam 81 engaging the roller 80 of the brackets 79 will cause the upper and lower platens 73 and 75 to move with the belt 55 and the material D travelling therewith. Thus, as the die knives 71 engage and traverse the material D, in the cutting operation, the dies are then travelling with the material and do so until they are instantaneously released therefrom in the manner described by the coaction of the shoulders 86 as they pass the shoulder 84 of cam 82 whereupon the cam rise of the cam 81 disengages from the roller 80 and the upper and lower platens 73 and 75 together with the dies return to normal position by spring action (not shown).

In connection with this action it will be noted that the shaft 56 is shown connected by the chain 87 with a sprocket on the belt drive shaft 52 which carries drive pulley 54 so that the latter is positively synchronized with the action of the cams, and the belt 55 and the material D moved thereby, are consequently moved at a co-related speed.

In order to provide for the quick release of the die from the material D, a means of supplying air pressure between the die and the material is established. The plate 68, sliding platen 73 and the die base 72 and die are orificed centrally to form the air inlet passage 87ª communicating with the enclosure 88 formed within the confines of the die cutter knife (see Fig. 12). A suitable flexible tube 89 is connected with the passage 87ª and leads to an air valve 90 which is in communication with a source of compressed air. The valve 90 is controlled by a depressible plunger 91 which projects downwardly and is designed to engage a suitable stationary element 92 on the plate 65. Therefore, as the carriage 67 moves downwardly in the cutting operation, the plunger 91 is engaged by the element 92 and depressed. This opens the valve 90 and permits compressed air to flow to the enclosure 88, the lower area of which is then closed by the material D. As a result, therefore, air pressure builds up in the enclosure during the cutting operation and as the die is raised from the material the air pressure assures a clean release.

The die assembly 71 is preferably so constructed as to permit the ready removal and ready mounting of the die cutter. For instance, as shown in Figs. 12 and 13 particularly, the die base 72 which includes the heating plate 93, is designed to include a die mounting plate 94 preferably formed with a projecting mounting handle 94ª. This plate has the dies 95 mounted thereon and is formed with the bevelled edges 96 designed to slide into engagement with the holding flange 97 of the opposed side plates 98 and 98ª which are fastened to the die assembly. The flanges 97 are spaced downwardly from the heating plate 93 to form a guideway to receive the bevelled edges of the mounting plate 94. Thus the mounting plate 94 may be quickly inserted in the guideways as shown in Fig. 13 and pushed to position as gauged by the stop bar 99 and pin 100 (Fig. 12). The side plate 98 is adjustable by means of the screw threaded adjusting element 98ᵇ which, when unscrewed slightly, causes the side plate 98 to be pressed back by means of the spring 98ᶜ permitting the plate 93 to slide readily into position. Thus, when the element 98ᵇ is tightened, the pressure of the flanges 97 against the bevelled edges 96 cause the plate 93 to be pressed tightly against the die mounting plate 94. Similarly, by reversing the above procedure, the plate 93 can easily be removed. Moreover, the mounting plate 94 of each die used in the machine can readily be preheated so that a quick change under practical conditions is provided for.

It will of course be obvious that the die cutting knife 101 of the dies used in the machine or the cutting knives 11 or 33 of the other forms previously described may be given desired cutting edge characteristics, such as bevelling as disclosed in Fig. 9, or may be bevelled and chamfered as shown at 102 and 103 in Fig. 15. In this way desired characteristics in the peripheral edge of the cut material are produced.

It will be apparent that the machine will permit the automatic cutting of shoe parts or other shaped pieces in comparatively fast manner, wherein the shaped parts are produced in multiple numbers where desired by the use of a number of cutter dies. In each case the die effects a clean cutting action and achieves the advantage previously outlined by reason of the heated knife.

What we claim as our invention is:

1. The method of cutting shaped pieces from plastic material having adhesive characteristics of the character described which comprise forming a cutting knife of a shape corresponding to the shape desired, heating said knife to a predetermined degree, causing a strip of said plastic material and an underlying web of carrying material to pass by said knife, intermittently causing said knife to traverse said material and winding said plastic material and said carrying material after said shapes have been cut therefrom.

2. The method as claimed in claim 1 in which said plastic material is wound on one roll and said carrying material is wound on another roll, the cut pieces being carried on said carrying material, said plastic material apart from the cut shapes thereof being stripped from said carrying material as it is wound on said rolls.

3. Apparatus for cutting plastic material of the character described which comprises means for moving a sheet of said plastic material over a base, a cutter knife disposed over said base, and having an outline corresponding to the shape to be cut from said material, means for heating said knife to a predetermined degree, means for moving said knife into engagement with said travelling material to cause it to traverse the latter, means for causing said knife to travel with said material as it is in engagement therewith, means for withdrawing said knife therefrom and means for returning said knife to its original position.

4. Apparatus for cutting plastic material of the character described which comprises means for moving a sheet of said plastic material over a base, a cutter knife disposed over said base, and having an outline corresponding to the shape to be cut from said material, a movable carriage designed to carry said knife, means for retaining said carriage and knife normally in spaced relation to said sheet, means for actuating said carriage towards said sheet to cause said knife to traverse said sheet, slidable means in connection with said carriage to cause said knife to travel with said sheet as it engages the latter and means for instantaneously releasing said carriage after said sheet has been traversed by said knife, said retaining means causing said carriage and said knife to move away from said sheet, means for returning said slidable means to original position and means for causing said sheet to travel synchronously with said slidable means.

5. Apparatus as claimed in claim 4, in which means is provided for creating air pressure between said cutting knife and the piece of material being cut by said cutting knife whereby to cause said cut piece to adhere to the moving means for said sheet as said cutter knife is withdrawn from said material.

6. Apparatus as claimed in claim 3, in which the cutter knife includes a base and means for creating an air pressure within the confines of the cutter knife and between said base and said material to cause ready release of said material from said cutter knife as the latter is withdrawn therefrom.

7. Apparatus for cutting plastic material of the character described, which comprises means for moving a sheet of said plastic material over a base, at least one cutting knife disposed over said base and having an outline corresponding to the shape to be cut from said material, means for heating said knife to a predetermined degree, means for moving said knife into engagement with said travelling material, means for causing said knife to travel with said material as it is in engagement therewith, means for withdrawing said knife therefrom, means for returning said knife to its original position, and means for creating air pressure between said cutting knife and the piece of material being cut by said knife whereby to cause said cut piece to disengage from said knife as the latter is withdrawn from said material.

CHARLES S. CHARRON.
LYMAN CRAWFORD-BROWN.

REFERENCES CITED

The following references are of record in the file of this patent:

UNITED STATES PATENTS

| Number | Name | Date |
|---|---|---|
| 490,824 | Hille | Jan. 31, 1893 |
| 751,527 | Marr | Feb. 9, 1904 |
| 1,905,837 | Flink | Apr. 25, 1933 |
| 1,995,395 | Tueth | Apr. 17, 1934 |
| 1,992,250 | Stacey | Feb. 26, 1935 |
| 2,086,238 | Platt | July 6, 1937 |
| 2,110,985 | Jacobson | Mar. 15, 1938 |
| 2,118,889 | Lyness | May 31, 1938 |
| 2,125,480 | Avery | Aug. 2, 1938 |
| 2,293,721 | Engler | Aug. 25, 1942 |
| 2,346,925 | Lewis | Apr. 18, 1944 |

FOREIGN PATENTS

| Number | Country | Date |
|---|---|---|
| 506,151 | Great Britain | May 23, 1939 |